United States Patent
Kang et al.

(10) Patent No.: US 8,806,189 B2
(45) Date of Patent: Aug. 12, 2014

(54) APPARATUS FOR ANALYZING TRAFFIC

(75) Inventors: Dong-Won Kang, Daejeon-si (KR);
Joon-Kyung Lee, Daejeon-si (KR);
Sang-Sik Yoon, Daejeon-si (KR);
Wang-Bong Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 168 days.

(21) Appl. No.: 13/333,248

(22) Filed: Dec. 21, 2011

(65) Prior Publication Data

US 2012/0167221 A1    Jun. 28, 2012

(30) Foreign Application Priority Data

Dec. 22, 2010   (KR) .................. 10-2010-0132730

(51) Int. Cl.
*H04L 29/06*        (2006.01)

(52) U.S. Cl.
CPC ............ *H04L 63/166* (2013.01); *H04L 63/168* (2013.01)

USPC ........... 713/151; 713/150; 713/152; 713/153; 713/154; 726/14; 726/15

(58) Field of Classification Search
CPC .......................... H04L 63/166; H04L 63/168
USPC ..................................... 726/24, 151
See application file for complete search history.

(56) References Cited

U.S. PATENT DOCUMENTS

| 7,508,768 | B2 | 3/2009 | Yoon et al. | |
| 2007/0195792 | A1* | 8/2007 | Chen et al. | 370/395.52 |
| 2011/0016523 | A1* | 1/2011 | Oh et al. | 726/22 |

FOREIGN PATENT DOCUMENTS

KR    10-0523486    6/2004

\* cited by examiner

*Primary Examiner* — Longbit Chai
(74) *Attorney, Agent, or Firm* — Staas & Halsey LLP

(57) ABSTRACT

An apparatus for analyzing traffic is provided. The apparatus may precisely identify and analyze web traffic through 5 tuple-, HTTP-, and request/response pair-based packet analysis by monitoring the correlation between sessions.

20 Claims, 6 Drawing Sheets

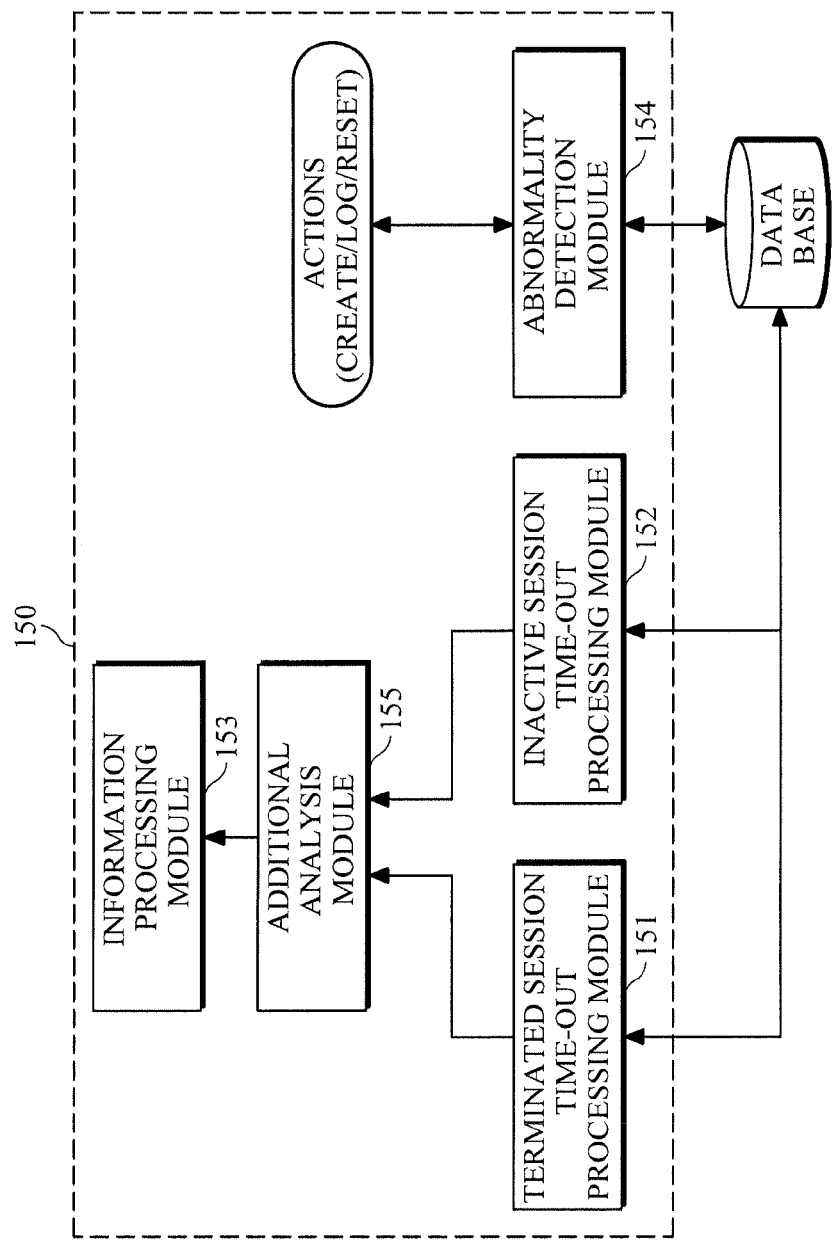

APPARATUS FOR ANALYZING TRAFFIC

CROSS-REFERENCE TO RELATED APPLICATION(S)

This application claims the benefit under 35 U.S.C. §119 (a) of Korean Patent Application No. 10-2010-0132730, filed on Dec. 22, 2010, in the Korean Intellectual Property Office, the entire disclosure of which is incorporated herein by reference for all purposes.

BACKGROUND

1. Field

The following description relates to a technique of analyzing traffic, and more particularly, an apparatus for analyzing traffic, which can precisely identify and analyze web traffic.

2. Description of the Related Art

There is a clear limit in precisely identifying the content of web traffic and providing detailed information on request/response pairs, which are one of the most important characteristics of web traffic, using current traffic analysis techniques.

Therefore, it is necessary to develop a technique capable of precisely identifying web traffic through the monitoring of the correlations between sessions of web traffic and effectively analyzing and controlling web traffic.

SUMMARY

The following description relates to an apparatus for analyzing traffic, which can precisely identify and analysis web traffic through 5 tuple-, HTTP-, and request/response pair-based packet analysis.

In one general aspect, there is provided An apparatus for analyzing traffic, including: a filtering unit configured to analyze a plurality of traffic packets according to a filtering rule and filter out a TCP packet from the traffic packets; a TCP analysis unit configured to identify whether the state of a 3-way handshake state (Synchronization (SYN), SYN/Acknowledgement (ACK), ACK) for the TCP packet is normal or abnormal and analyze the TCP packet of which the 3-way handshake state is identified as being normal; an HTTP analysis unit configured to identify whether the TCP packet is an HTTP packet based on the content of a HTTP request/response header of the TCP packet and analyze the HTTP packet; and a pair analysis unit configured to align requests and responses, are detected randomly in connection with the HTTP packet without regard to their order, so that the requests and the responses can pair with each other, and to analyze pairs of the requests and the responses.

Other features and aspects may be apparent from the following detailed description, the drawings, and the claims.

BRIEF DESCRIPTION OF THE DRAWINGS

FIG. 6 is a diagram illustrating an example of an integrated management unit illustrated in FIG. 1.

Figure 1:
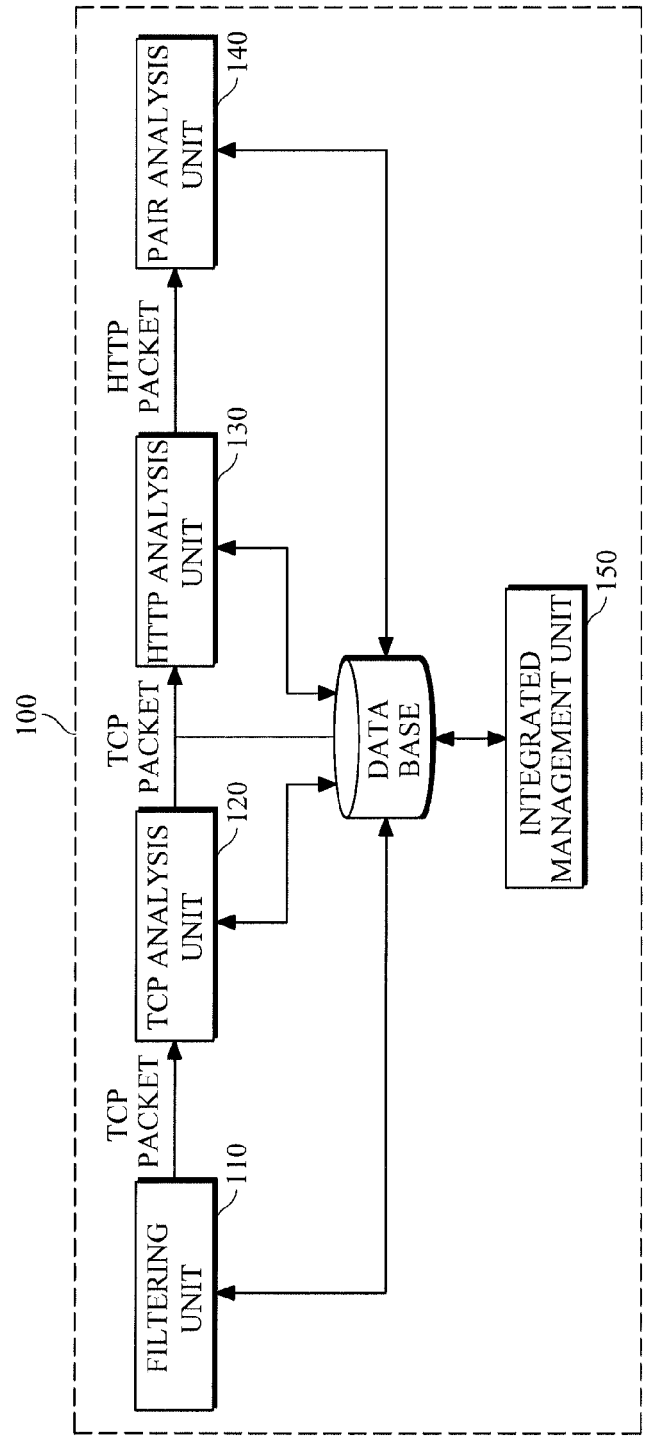
FIG. 1 is a diagram illustrating an example of an apparatus for analyzing traffic.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of an apparatus for analyzing traffic. Referring to FIG. 1, apparatus 100 includes a filtering unit 110, a TCP analysis unit 120, an HTTP analysis unit 130, and a pair analysis unit 140.

The filtering unit 110 may analyze one or more input traffic packets according to a filtering rule, and may filter out a TCP packet from the input traffic packets. For example, the filtering rule may specify which packets to pass and which packets to exclude, and may be stored in a database. The structure and operation of the filtering unit 110 will be described later with reference to FIG. 2.

The TCP analysis unit 120 may identify whether the state of a 3-way handshake state (Synchronization (SYN), SYN/Acknowledgement (ACK), ACK) for the TCP packet is normal or abnormal, and may analyze the TCP packet. The TCP analysis unit 120 may analyze the TCP packet based on a 5 tuple that is defined as the combination of a source IP address, a destination IP address, protocol type, a source port number, and a destination port number. The structure and operation of the TCP analysis unit 120 will be described later with reference to FIG. 3.

The HTTP analysis unit 130 may identify whether the TCP packet analyzed by the TCP analysis unit 120 is an HTTP packet based on the content of the HTTP request/response header of the TCP packet, and may analyze the HTTP packet. The HTTP analysis unit 130 may analyze a packet based on the content of the packet. The structure and operation of the HTTP analysis unit 130 will be described later with reference to FIG. 4.

The pair analysis unit 140 may align requests and responses that are identified randomly in connection with the HTTP packet analyzed by the HTTP analysis unit 130 regardless of their order so that the requests and the responses may pair with each other. The pair analysis unit 140 may analyze the request/response pairs. The pair analysis unit 140 may analyze a packet based on requests and responses that are associated with the packet. The structure and operation of the pair analysis unit 140 will be described later with reference to FIG. 5.

In the example illustrated in FIG. 1, the apparatus 100 may precisely identify and analyze web traffic through the 5 tuple-, HTTP-, and request/response pair-based analysis of one or more packets that are selected by the filtering unit 110 by using the TCP analysis unit 120, the HTTP analysis unit 130, and the pair analysis unit 140.

The apparatus 100 may also include an integrated management unit 150. The integrated management unit 150 may perform abnormality detection by monitoring the correlation between sessions and using integrated statistics information. The structure and operation of the integrated management unit 150 will be described later with reference to FIG. 6.

In the example illustrated in FIG. 1, the apparatus 100 may further precisely identify and analyze web traffic through the 5 tuple-, HTTP-, and request/response pair-based analysis of the one or more packets that are selected by the filtering unit 110 by monitoring the correlation between TCP and HTTP sessions with the aid of the integrated management unit 150 and performing abnormality detection based on integrated statistics information.

Figure 2:
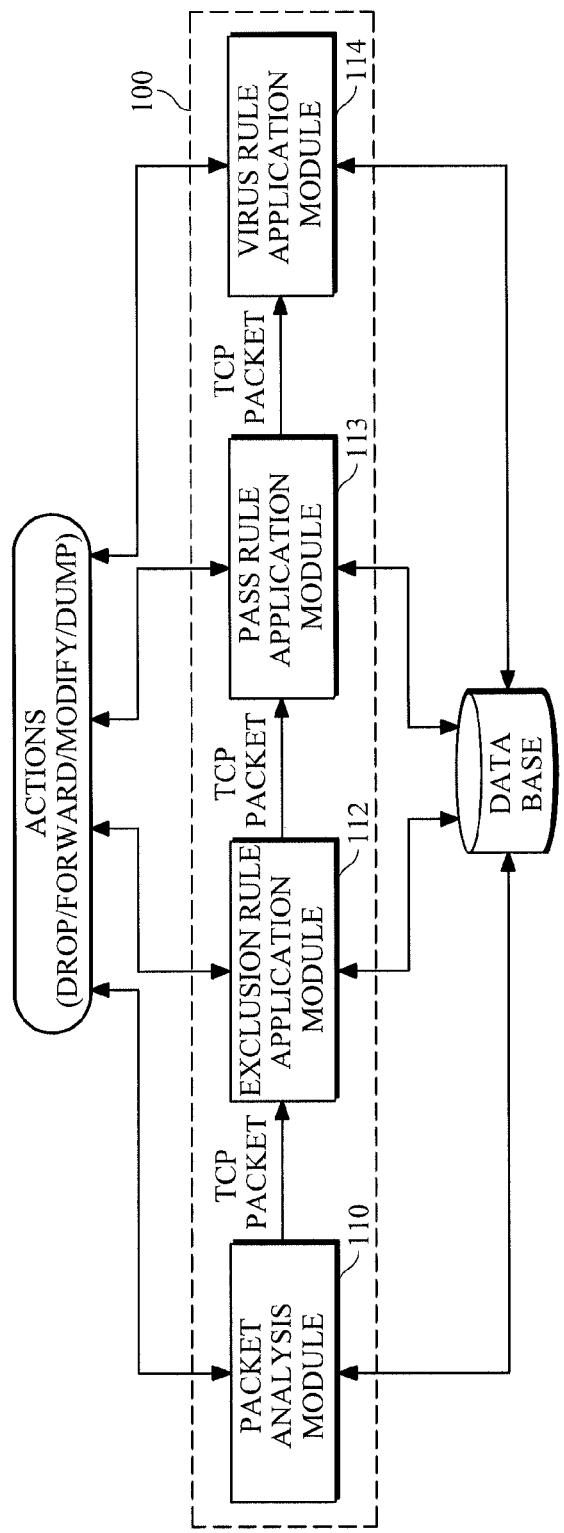
FIG. 2 is a diagram illustrating an example of a filtering unit illustrated in FIG. 1.

FIG. 2 illustrates an example of the filtering unit 110. Referring to FIG. 2, the filtering unit 110 includes a packet analysis module 111, an exclusion rule application module 112, and a pass rule application module 113.

The packet analysis module 111 may analyze traffic packets, may extract one or more TCP packets from the web traffic from the traffic packets, and may store the results of the analysis. For example, the packet analysis module 111 may analyze the source IP addresses, destination IP addresses, protocol type, source port numbers, and destination port numbers of the traffic packets, and may extract one or more TCP packets from the traffic packets based on the results of the analysis of the traffic packets. The traffic analysis module 111 may generate statistic information on the extraction of the TCP packets based on the results of the analysis of the traffic packets, and may store the generated statistics information in a database.

The packet analysis module 111 may pass only TCP packets therethrough, and may perform a predefined action on non-TCP packets. For example, the predefined action may be 'drop,' 'forward,' 'modify,' 'dump,' or the like.

The exclusion rule application module 112 may apply an exclusion rule to the TCP packets provided by the packet analysis module 111, may exclude one or more TCP packets that meet the exclusion rule, may generate statistics information on the exclusion of the TCP packets that meet the exclusion rule, and may store the generated statistics information in the database.

The exclusion rule application module 112 may perform a predefined action on the TCP packets that meet the exclusion rule. For example, the predefined action may be 'drop,' 'forward,' 'modify,' 'dump,' or the like.

The pass rule application module 113 may apply a pass rule to the TCP packets provided by the exclusion rule application module 112, may pass one or more TCP packets that meet the pass rule therethrough, may generate statistics information on the passing of the TCP packets that meet the pass rule, and may store the generated statistics information in the database.

The pass rule application module 113 may perform a predefined action on one or more TCP packets that do not meet the pass rule. For example, the predefined action may be 'drop,' 'forward,' 'modify,' 'dump,' or the like.

In the example illustrated in FIG. 2, the filtering unit 110 may remove unnecessary packets, before the identification and analysis of web traffic, with the use of the packet analysis module 111, the exclusion rule application module 112, and the pass rule application module 113, and may thus allow only target packets to be analyzed. Therefore, it is possible to improve the efficiency of the identification and analysis of packets.

The filtering unit 110 may also include a virus rule application module 114. The virus rule application module 114 may apply a virus rule to the TCP packets provided by the pass rule application module 113, may exclude one or more TCP packets that meet the virus rule, may generate statistics information on the exclusion of the TCP packets that meet the virus rule, and may store the generated statistics information in the database.

The virus rule application module 114 may perform a predefined action on the TCP packets that meet the virus rule. For example, the predefined action may be 'drop,' 'forward,' 'modify,' 'dump,' or the like.

In the example illustrated in FIG. 2, the filtering unit 110 may remove any malicious TCP packets beforehand with the use of the virus rule application module 114, and may allow only normal packets to be analyzed. Accordingly, it is possible to stably identify and analyze packets.

Figure 3:
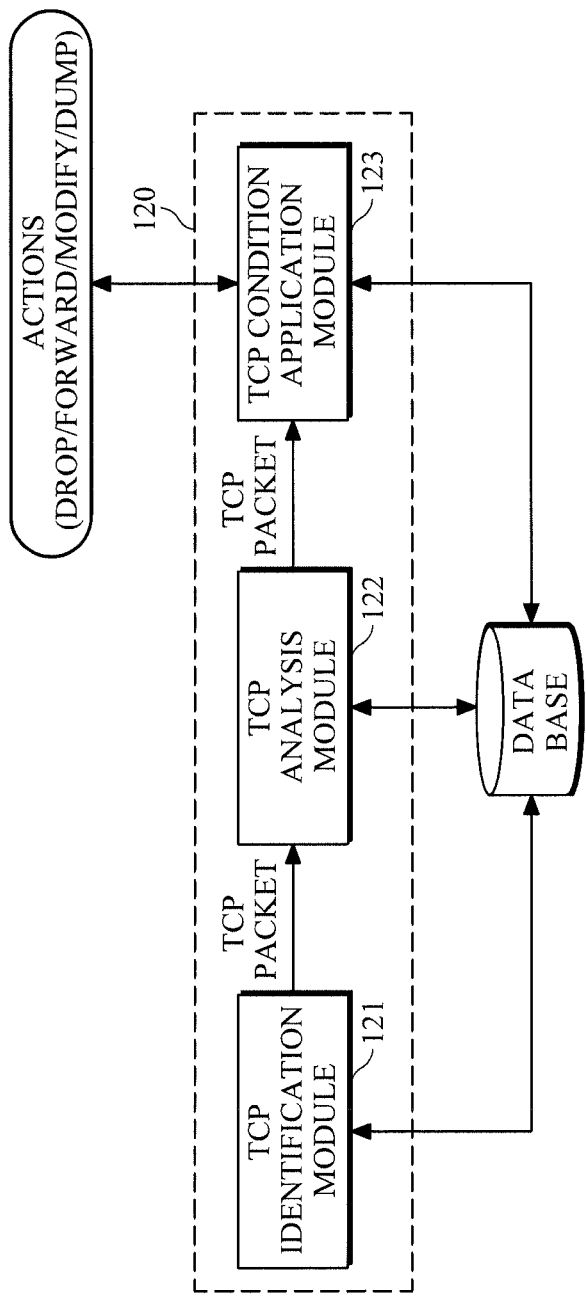
FIG. 3 is a diagram illustrating an example of a TCP analysis unit illustrated in FIG. 1.

FIG. 3 illustrates an example of the TCP analysis unit 120. Referring to FIG. 3, the TCP analysis unit 120 includes a TCP identification module 121 and a TCP analysis module 122.

The TCP identification module 121 may identify whether the 3-way handshake state of an input TCP packet is normal or abnormal. For example, the TCP identification module 121 may manage a TCP session through an identification of one or more TCP flags. To manage the TCP session, the TCP identification module 121 may identify whether the 3-way handshake state of the input TCP packet is normal or abnormal. The TCP identification module 121 may identify the end of the TCP session. For example, the TCP identification module 121 may identify the end of the TCP session by identifying the Finish (FIN) or Reset (RST) flag.

TCP flags include the SYN flag for requesting a TCP connection, the ACK flag for sending an ACK, the RST flag for terminating an abnormal TCP connection, the Push (PSH) flag for sending received data directly to the Application layer, the Urgent (URG) flag for sending urgent data, and the FIN flag for terminating a TCP connection normally.

In response to the TCP identification module 121 determining the 3-way handshake state of the input TCP packet to be normal, The TCP analysis module 122 may analyze the input TCP packet, and may store the results of the analysis of the input TCP packet.

For example, the TCP analysis module 122 may analyze the input TCP packet based on the 5 tuple of the input TCP packet, may generate statistics information based on the results of the analysis of the input TCP packet, and may store the generated statistics information. In response to the analysis of the input TCP packet being complete, the TCP analysis module 122 may create an HTTP session for subsequent analysis processes.

5 tuple-based packet analysis is well known to one of ordinary skill in the art to which the present invention pertains, and thus, a detailed description thereof will be omitted.

In the example illustrated in FIG. 3, the TCP analysis unit 120 may perform 5 tuple-based packet analysis, and may store the results of 5 tuple-based packet analysis as statistics information so that subsequent analysis processes may proceed.

The TCP analysis unit 120 may also include a TCP condition application module 123. The TCP condition application module 123 may apply a TCP condition rule to the input TCP packet, and may exclude the input TCP packet if the input TCP packet meets the TCP condition rule.

The TCP analysis unit 120 may determine whether to perform HTTP-based analysis on the input TCP packet with the use of the TCP condition application module 123. For example, the TCP condition rule may be a rule for excluding packets that do not need to be subject to HTTP-based packet analysis. Accordingly, the TCP analysis unit 120 may exclude TCP packets that meet the TCP condition rule, and may pass only TCP packets that do not meet the TCP condition rule therethrough.

The TCP condition application module 123 may perform a predefined action on the TCP packets that meet the TCP condition rule. For example, the predefined action may be 'drop,' 'forward,' 'modify,' 'dump,' or the like. For example, the TCP condition application module 123 may drop an invalid TCP packet that meets the TCP condition rule.

Figure 4:
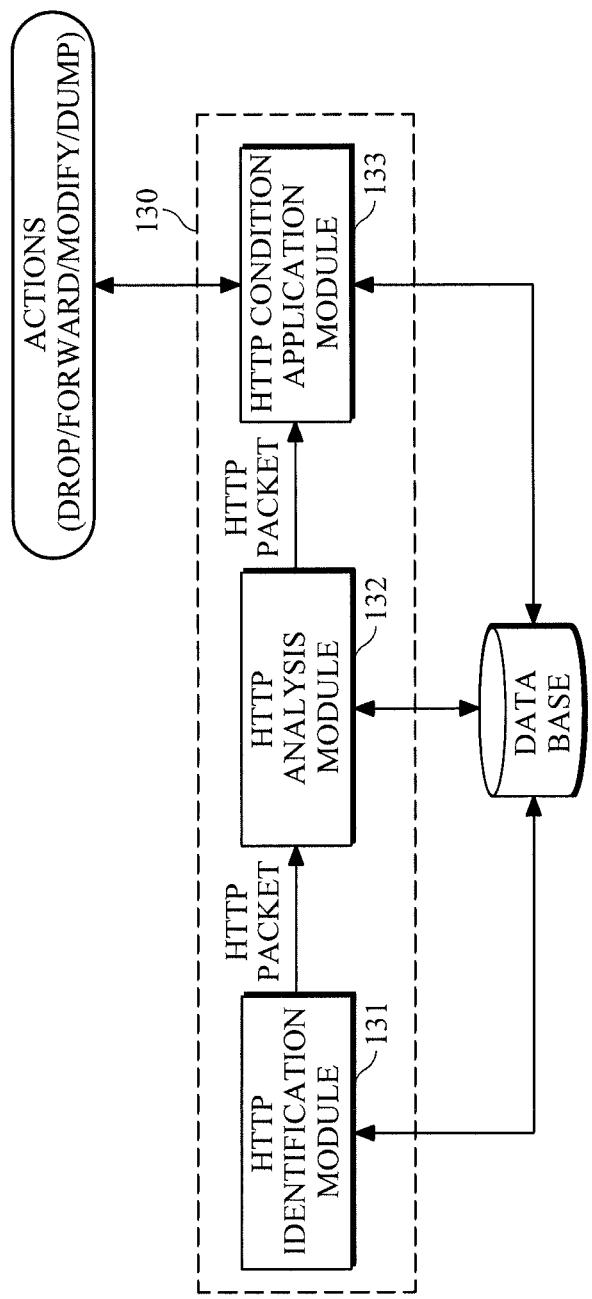
FIG. 4 is a diagram illustrating an example of an HTTP analysis unit illustrated in FIG. 1.

FIG. 4 illustrates an example of the HTTP analysis unit 130. Referring to FIG. 4, the HTTP analysis unit 130 includes an HTTP identification module 131 and an HTTP analysis module 132.

The HTTP identification module 131 may identify whether or not an input TCP packet is an HTTP packet based on the content of the HTTP request/response header of the input TCP packet according to a predefined HTTP request/response pattern rule.

For example, the HTTP identification module 131 may determine whether an HTTP session created by the TCP analysis unit 120 is an actual HTTP application. If an HTTP request being recognized from a predefined packet, the HTTP session created by the TCP analysis unit 120 may be processed as an unknown application. An HTTP session that is processed as an unknown application may simply be subject to statistical processing.

The HTTP analysis module 132 may analyze an HTTP packet identified by the HTTP identification module 131, and may store the results of the analysis. For example, the HTTP analysis module 132 may be configured to perform TCP sequence-based packet record sorting.

The HTTP analysis module 132 may sort packet records based on analyzed data. For example, the HTTP analysis module 132 may identify a request/response packet, and may fetch a packet to the head of a record table. In response to the fetched record including 'NULL' data, the HTTP analysis module 132 may insert the current packet in the head of the record table. if there is a packet in the fetched record, the HTTP analysis module 132 may compare the sequence number of the current packet with the sequence number of the packet in the fetched record.

If the sequence number of the current packet is greater than the sequence number of the packet in the fetched record, the HTTP analysis module 132 may insert the current packet into the head of the record table. If the sequence number of the current packet is not greater than the sequence number of the packet in the fetched record, the HTTP analysis module 132 may determine whether the sequence number of the current packet is the same as the sequence number of the packet in the fetched record. If the sequence number of the current packet is the same as the sequence number of the packet in the fetched record, the HTTP analysis module 132 may overwrite the head of the record table with the current packet. If the sequence number of the identified packet is not the same as the sequence number of the packet in the fetched record, the HTTP analysis module 132 may fetch a next record in a doubly linked list, and may perform the above-mentioned processes repeatedly until the end of the doubly linked list is encountered.

The HTTP analysis module 132 may perform HTTP-based packet analysis, and may store the result of HTTP-based packet analysis in a database as statistics information. HTTP-based packet analysis is well known to one of ordinary skill in the art to which the present invention pertains, and thus, a detailed description thereof will be omitted.

In short, the HTTP analysis module 132 may perform HTTP-based packet analysis, and may store the results of HTTP-based packet analysis as statistics information so that subsequent analysis processes may proceed.

The HTTP analysis unit 130 may also include an HTTP condition application module 133. The HTTP condition application module 133 may apply an HTTP condition rule to an HTTP packet analyzed by the HTTP analysis module 132, and may exclude the HTTP packet if the HTTP packet meets the HTTP condition rule.

The HTTP analysis unit 130 may determine whether to perform request/response pair-based packet analysis with the aid of the HTTP condition application module 133. For example, the HTTP condition rule may be a rule for excluding packets that do not need to be subject to request/response pair-based packet analysis. The HTTP analysis unit 130 may exclude HTTP packets that meet the HTTP condition rule, and may pass HTTP packets that do not meet the HTTP condition rule therethrough.

The HTTP condition application module 133 may perform a predefined action on the HTTP packets that are excluded. For example, the predefined action may be 'drop,' 'forward,' 'modify,' 'dump,' or the like. For example, the HTTP condition module 133 may dump an HTTP packet whose total request count exceeds 20.

Figure 5:
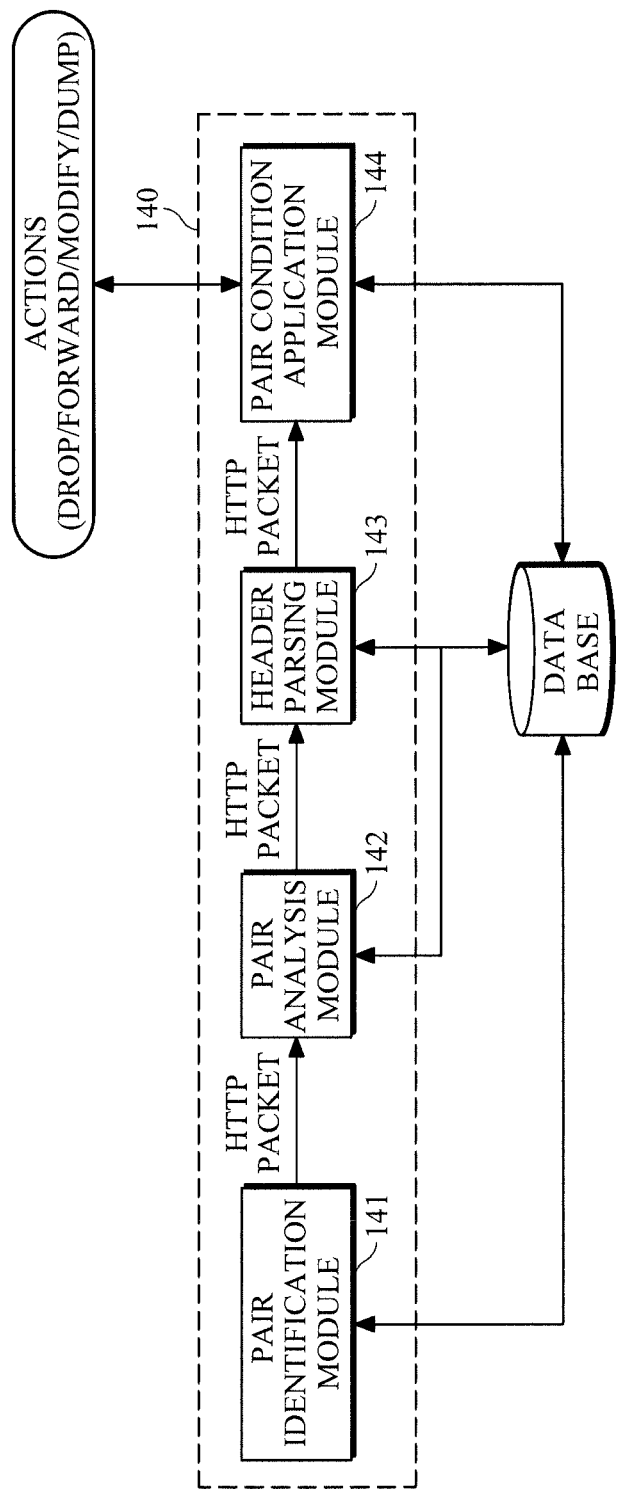
FIG. 5 is a diagram illustrating an example of a pair analysis unit illustrated in FIG. 1.

FIG. 5 illustrates an example of the pair analysis unit 140. Referring to FIG. 5, the pair analysis unit 140 includes a pair identification module 141 and a pair analysis module 142.

The pair identification module 141 may identify whether an input HTTP packet is a request packet or a response packet. For example, the pair identification module 141 may identify whether the input HTTP packet is a request packet or a response packet based on the HTTP header of the input HTTP packet. An HTTP header may be classified into a request header for requesting data or a response header for responding to a request. The pair identification module 141 may analyze the HTTP header of the input HTTP packet, and may determine whether the input HTTP packet is a request packet or a response packet based on the results of the analysis.

The pair analysis module 142 may complete a request/response pair based on state information of the request/response pair and the ACK number of the request/response pair. The pair analysis module 142 may store the results of request/response pair-based packet analysis.

For example, the pair analysis module 142 may perform request/response pair-based packet analysis, and may store the results of request/response pair-based packet analysis in a database as statistics information. Request/response pair-based packet analysis is well known to one of ordinary skill in the art to which the present invention pertains, and thus, a detailed description thereof will be omitted.

In short, the pair analysis unit 140 may perform request/response pair-based packet analysis, and may store the results of request/response pair-based packet analysis in a database as statistics information.

The pair analysis unit 140 may also include a header parsing module 143. The header parsing module 143 may analyze an HTTP header according to a header parsing rule. The header parsing rule is well known to one of ordinary skill in the art to which the present invention pertains, and thus, a detailed description thereof will be omitted.

The pair analysis unit 140 may also include a pair condition application module 144. The pair condition application module 144 may apply a pair condition rule to a request/response pair analyzed by the pair analysis module 142, and may exclude the request/response pair if the request/response pair meets the pair condition rule.

The pair condition application module 144 may perform a predefined action on request/response pairs that meet the pair condition rule. For example, the predefined action may be 'drop,' 'forward,' 'modify,' 'dump,' or the like. For example, the pair condition application module 144 may drop a request/response pair that meets the following pair condition rule: 'not complete pair-request only' or 'response only.'

FIG. 6 illustrates an example of the integrated management unit 150. Referring to FIG. 6, the integrated management unit 150 includes a terminated session time-out processing module 151, an in active session time-out processing module 152, and an information processing module 153.

The terminated session time-out processing module 151 may perform time-out processing on TCP, HTTP, request/response pair records that correspond to a terminated session. For example, the terminated session time-out processing module 151 may perform time-out processing on a TCP or HTTP session that is terminated in response to the analysis of packets by the TCP analysis unit 120, the HTTP analysis unit 120, and the pair analysis unit 140 being complete.

The inactive session time-out processing module 152 may perform time-out processing on a session that does not change for more than a predefined amount of time by scanning a TCP session record table, an HTTP session record table, and request/response pair records.

For example, in response to a TCP session being created, TCP session information may be recorded in the TCP session record table. For example, in response to an HTTP session being created, HTTP session information may be recorded in the HTTP session record table. In response to a request/response pair being determined, a request/response pair record may be created.

The inactive session time-out processing module 152 may detect an inactive TCP or HTTP session with reference to the TCP session record table, the HTTP session record table, and the request/response pair records, and may perform time-out processing on the detected session.

The information processing module 153 may generate information on timed-out TCP, HTTP, and request/response pair records and integrated statistics information. For example, the information processing module 153 may generate time-out processing result data based on the results of time-out processing performed by the terminated session time-out processing module 151 and the inactive session time-out processing module 152. For example, the information processing module 153 may generate integrated statistics information by integrating the statistics information generated by the TCP analysis unit 120, the HTTP analysis unit 130, and the pair analysis unit 140, and may store the integrated statistics information.

In short, the integrated management unit 150 may monitor the correlation between TCP and HTTP sessions based on the management of the records on the TCP and HTTP sessions and the termination of the TCP and HTTP sessions, and may establish integrated statistics information by integrating 5 tuple-, HTTP-, and request/response pair-based packet analysis result data provided by the TCP analysis unit 120, the HTTP analysis unit 130, and the pair analysis unit 140.

The integrated management unit 150 may also include an abnormality detection module 154. The abnormality detection module 154 may detect an abnormal condition based on collected statistics information, and may perform a predefined action on the detected abnormal condition. For example, the predefined action may be 'create,' 'log,' and 'reset.' For example, the abnormality detection module 154 may detect an abnormal condition from an abnormal condition/action table that is created based on integrated statistics information obtained by integrating 5 tuple-, HTTP-, and request/response pair-based packet analysis results, and may perform the predefined action on the detected abnormal condition.

The integrated management unit 150 may also include an additional analysis module 155. The additional analysis module 155 may perform additional analysis, if necessary, on request/response pair records that are timed out.

As described above, it is possible to precisely identify and analyze web traffic through 5 tuple-, HTTP-, and request/response pair-based packet analysis by monitoring the correlation between sessions.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for analyzing traffic, comprising:
a filtering unit running on a processor configured to analyze a plurality of traffic packets according to a filtering rule and filter out a TCP packet from the traffic packets;
a TCP analysis unit configured to identify whether the state of a 3-way handshake state (Synchronization (SYN), SYN/Acknowledgement (ACK) for the TCP packet is normal or abnormal and analyze the TCP packet of which the 3-way handshake state is identified as being normal;
an HTTP analysis unit configured to identify whether the TCP packet is an HTTP packet based on the content of a HTTP request/response header of the TCP packet and analyze the HTTP packet; and
a pair analysis unit configured to parse requests and responses HTTP packets without regard to their order that client sends requests and then server sends response packet or vice versa, and to reorder the requests and the responses sequence so that the requests and the responses can pair with each other correctly, and to correlate between TCP and HTTP sessions based upon management of a record table on the TCP and HTTP sessions and terminations of the TCP and HTTP sessions by, at least, inserting a current packet into a head of the record table if a sequence number of the current packet is greater than the sequence number of the packet in fetched record.

2. The apparatus of claim 1, further comprising:
an integrated management unit configured to perform abnormality detection by monitoring a correlation between sessions that are identified and using integrated statistics information.

3. The apparatus of claim 2, wherein the integrated management unit comprises:
a terminated session time-out processing module configured to perform time-out processing on TCP, HTTP, and request/response pair records that correspond to a terminated session;
an inactive session time-out processing module configured to perform time-out processing on an inactive session that does not change for more than a predefined amount of time by scanning a TCP session record table, an HTTP session record table, and request/response pair records; and
an information processing module configured to generate information on timed-out TCP, HTTP, and request/response pair records and integrated statistics information.

4. The apparatus of claim 3, wherein the integrated management unit further comprises:

an abnormality detection module configured to detect an abnormal condition based on collected statistics information and perform a predefined action on the detected abnormal condition.

5. The apparatus of claim 3, wherein the integrated management unit further comprises:
an additional analysis module configured to perform additional analysis on the timed-out request/response pair records if necessary.

6. The apparatus of claim 1, wherein the filtering unit comprises:
a packet analysis module configured to analyze the traffic packets and extract the TCP packet from the traffic packets;
an exclusion rule application module configured to apply an exclusion rule to the TCP packet and to exclude the TCP packet in response to the TCP packet meeting the exclusion rule; and
a pass rule application module configured to apply a pass rule to the TCP packet and to pass the TCP packet therethrough in response to the TCP packet meeting the pass rule.

7. The apparatus of claim 6, wherein the filtering unit further comprises:
a virus rule application module configured to apply a virus rule to the TCP packet and to exclude the TCP packet in response to the TCP packet meeting the virus rule.

8. The apparatus of claim 6, wherein the packet analysis module is further configured to store results of the analysis of the traffic packets.

9. The apparatus of claim 1, wherein the TCP analysis unit comprises:
a TCP identification module configured to identify whether a 3-way handshake state of the TCP packet is normal or abnormal; and
a TCP analysis module configured to analyze the TCP packet in response to the 3-way handshake state of the TCP packet being identified as being normal.

10. The apparatus of claim 9, wherein the TCP analysis unit further comprises:
a TCP condition application module configured to apply a TCP condition rule to the TCP packet and to exclude the TCP packet in response to the TCP packet meeting the TCP condition rule.

11. The apparatus of claim 9, wherein the TCP identification module is further configured to identify an end of a TCP session.

12. The apparatus of claim 9, wherein the TCP analysis module is further configured to store results of the analysis of the TCP packet in response to the 3-way handshake state of the TCP packet being identified as being normal.

13. The apparatus of claim 1, wherein the HTTP analysis unit comprises:
an HTTP identification module configured to identify whether the TCP packet is an HTTP packet or a non-HTTP packet based on the content of an HTTP request/response header of the TCP packet according to a predefined HTTP request/response pattern rule; and
an HTTP analysis module configured to analyze the HTTP packet.

14. The apparatus of claim 13, wherein the HTTP analysis unit further comprises:
an HTTP condition application module configured to apply an HTTP condition rule to the HTTP packet and to exclude the HTTP packet in response to the HTTP packet meeting the HTTP condition rule.

15. The apparatus of claim 13, wherein the HTTP analysis module is further configured to perform TCP sequence-based packet record sorting.

16. The apparatus of claim 13, wherein the HTTP analysis module is further configured to store results of the analysis of the HTTP packet.

17. The apparatus of claim 1, wherein the pair analysis unit comprises:
a pair identification module configured to identify a request/response pair; and
a pair analysis module configured to analyze state information, a TCP sequence number, and an acknowledgement (ACK) number of the request/response pair and complete the request/response pair based on results of the analysis of the state information, the TCP sequence number, and the ACK number.

18. The apparatus of claim 17, wherein the pair analysis unit further comprises:
a header parsing module configured to analyze the HTTP packet according to a header parsing rule.

19. The apparatus of claim 18, wherein the pair analysis unit further comprises:
a pair condition application module configured to apply a pair condition rule to the request/response pair and to exclude the request/response pair in response to the request/response pair meeting the pair condition rule.

20. The apparatus of claim 17, wherein the pair analysis module is further configured to store results of the analysis of the request/response pair.

* * * * *